(12) United States Patent
Xu et al.

(10) Patent No.: US 10,511,834 B2
(45) Date of Patent: Dec. 17, 2019

(54) METHOD AND APPARATUS FOR INTRA BLOCK COPY REFERENCE LIST CONSTRUCTION

(71) Applicant: HFI Innovation Inc., Zhubei, Hsinchu County (TW)

(72) Inventors: Xiaozhong Xu, State College, PA (US); Shan Liu, San Jose, CA (US)

(73) Assignee: HFI Innovation Inc., Zhubei, Hsinchu County (TW)

( * ) Notice: Subject to any disclaimer, the term of this patent is extended or adjusted under 35 U.S.C. 154(b) by 0 days.

(21) Appl. No.: 15/568,953

(22) PCT Filed: Apr. 29, 2016

(86) PCT No.: PCT/CN2016/080587
§ 371 (c)(1),
(2) Date: Oct. 24, 2017

(87) PCT Pub. No.: WO2016/173519
PCT Pub. Date: Nov. 3, 2016

(65) Prior Publication Data
US 2018/0124394 A1 May 3, 2018

Related U.S. Application Data

(60) Provisional application No. 62/183,799, filed on Jun. 24, 2015, provisional application No. 62/182,685, (Continued)

(51) Int. Cl.
*H04N 19/105* (2014.01)
*H04N 19/573* (2014.01)
(Continued)

(52) U.S. Cl.
CPC ......... *H04N 19/105* (2014.11); *H04N 19/139* (2014.11); *H04N 19/172* (2014.11);
(Continued)

(58) Field of Classification Search
CPC .. H04N 19/105; H04N 19/139; H04N 19/172; H04N 19/174; H04N 19/573; H04N 19/159; H04N 19/58; H04N 19/593
(Continued)

(56) References Cited

U.S. PATENT DOCUMENTS

2013/0155184 A1* 6/2013 Chen .................... H04N 19/597
348/43
2013/0188697 A1 7/2013 Ye et al.
(Continued)

FOREIGN PATENT DOCUMENTS

WO   WO 2011/049605 A1   4/2011

OTHER PUBLICATIONS

International Search Report dated Jul. 8, 2016, issued in application No. PCT/CN2016/080587.
(Continued)

*Primary Examiner* — Matthew K Kwan
(74) *Attorney, Agent, or Firm* — Oblon, McClelland, Maier & Neustadt, L.L.P.

(57) ABSTRACT

A method and apparatus of reference picture list construction for video encoding and decoding includes considering a current picture when an Intra Picture Block Copy (IntraBC) mode is allowed. Embodiments of the reference picture list construction process comprise receiving input data of a current slice in the current picture, determining a temporary reference picture list for the current slice, and determining a final reference picture list from the temporary reference picture list. The reference picture list construction process further comprises adjusting the final reference picture list by setting the current picture to a predefined position in the final reference picture list if the IntraBC mode is allowed. An example of the predefined position is the last position. An example of the reference picture list construc-
(Continued)

tion only inserts the current picture into the predefined position when reference picture list modification is not used.

11 Claims, 13 Drawing Sheets

Related U.S. Application Data filed on Jun. 22, 2015, provisional application No. 62/169,698, filed on Jun. 2, 2015, provisional application No. 62/154,373, filed on Apr. 29, 2015.

(51) Int. Cl.
*H04N 19/139* (2014.01)
*H04N 19/172* (2014.01)
*H04N 19/174* (2014.01)
*H04N 19/593* (2014.01)
*H04N 19/159* (2014.01)
*H04N 19/58* (2014.01)

(52) U.S. Cl.
CPC ......... *H04N 19/174* (2014.11); *H04N 19/573* (2014.11); *H04N 19/593* (2014.11); *H04N 19/159* (2014.11); *H04N 19/58* (2014.11)

(58) Field of Classification Search
USPC .................................................. 375/240.02
See application file for complete search history.

(56) References Cited

U.S. PATENT DOCUMENTS

| 2014/0016699 | A1* | 1/2014 | Chen | H04N 19/70 |
| | | | | 375/240.12 |
| 2014/0376634 | A1 | 12/2014 | Guo et al. | |
| 2015/0055703 | A1 | 2/2015 | Pang et al. | |
| 2016/0323598 | A1* | 11/2016 | Rusert | H04N 19/597 |
| 2017/0289566 | A1* | 10/2017 | He | H04N 19/52 |

OTHER PUBLICATIONS

Extended European Search Report dated Nov. 6, 2018.
Ramasubramonian A K et al: "MV-HEVC/SHVC HLS: Inter-layer reference pictures in reference picture list initialization", 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-E0062, Jul. 16, 2013 (Jul. 16, 2013), XP030131064.
Li B et al: "Non-SCCE1: Unification of intra BC and inter modes", 18. JCT-VC Meeting; Jun. 30, 2014-Jul. 7, 2014; Sapporo; (Joint Collaborative Team on Video Coding of ISO/IEC JTC1/SC29/WG11 and ITU-T SG.16 ); URL: http://wftp3.itu.int/av-arch/jctvc-site/,, No. JCTVC-R0100-v2, Jun. 29, 2014 (Jun. 29, 2014), XP030116357.
R. Sjoberg et al: "Overview of HEVC high-level syntax and reference picture management", IEEE Transactions on Circuits and Systems for Video Technology, Jan. 1, 2012 (Jan. 1, 2012), pp. 1-14, XP055045360, US ISSN: 1051-8215, DOI: 10.1109/TCSVT.2012.2223052.

* cited by examiner

| Number of reference pictures allowed =3 | Reference picture List 0 | | | Outside List 0 | |
|---|---|---|---|---|---|
| Reference picture Index | 0 | 1 | 2 | 3 | 4 |
| Current POC in decoding order | 0 | 0 | | | | |
| | 4 | 0 | 4 | | | |
| | 2 | 0 | 4 | 2 | 1 | |
| | 1 | 0 | 2 | 4 | 1 | |
| | 3 | 2 | 0 | 4 | 3 | |

```
rIdx = 0
while (rIdx < NumRpsCurrTempList0) {
    for (i = 0; i < NumPocStCurrBefore && rIdx < NumRpsCurrTempList0; rIdx++, i++)
        RefPicListTemp0 [rIdx] = RefPicSetStCurrBefore [i]
    for (i = 0; i < NumPocStCurrAfter && rIdx < NumRpsCurrTempList0; rIdx++, i++)
        RefPicListTemp0 [rIdx] = RefPicSetStCurrAfter [i]
    for (i = 0; i < NumPocLtCurr && rIdx < NumRpsCurrTempList0; rIdx++, i++)
        RefPicListTemp0 [rIdx] = RefPicSetLtCurr [i]
    if (curr pic as ref enabled flag)
        RefPicListTemp0 [rIdx++] = currPic
}
for (rIdx = 0; rIdx <= num ref idx l0 active minus1; rIdx++)
    RefPicList0 [rIdx] = ref pic list modification flag l0 ?
        RefPicListTemp0 [list entry l0 [rIdx]] : RefPicListTemp0 [rIdx]

If (curr pic as ref enabled flag
    && NumRpsCurrTempList0 > num ref idx l0 active minus1+1)
    RefPicList0 [num ref idx l0 active minus1] = currPic
```
— 510

Fig. 5

```
rIdx = 0
while (rIdx < NumRpsCurrTempList0) {
    for (i = 0; i < NumRpsCurrTempList0; rIdx++, i++)
        RefPicListTemp0 [rIdx] = RefPicSetStCurrBefore [i]
    for (i = 0; i < NumRpsCurrTempList0; rIdx++, i++)
        RefPicListTemp0 [rIdx] = RefPicSetStCurrAfter [i]
    for (i = 0; i < NumRpsCurrTempList0; rIdx++, i++)
        RefPicListTemp0 [rIdx] = RefPicSetLtCurr [i]
    if (curr_pic_as_ref_enabled_flag)
        RefPicListTemp0 [rIdx++] = currPic
}
for (rIdx = 0; rIdx <= num_ref_idx_l0_active_minus1; rIdx++)
    RefPicList0 [rIdx] = ref_pic_list_modification_flag_l0 ?
        RefPicListTemp0 [list_entry_l0 [rIdx]] : RefPicListTemp0 [rIdx]
```

If (curr_pic_as_ref_enabled_flag && !ref_pic_list_modification_flag_l0
&& NumRpsCurrTempList0 > num_ref_idx_l0_active_minus1+1)
    RefPicList0 [num_ref_idx_l0_active_minus1] = currPic

Fig. 6

```
rIdx = 0
while (rIdx < NumRpsCurrTempList0) {
    for (i = 0; i < NumRpsCurrTempBefore && rIdx < NumRpsCurrTempList0; rIdx++, i++)
        RefPicListTemp0[rIdx] = RefPicSetStCurrBefore[i]
    for (i = 0; i < NumRpsCurrTempAfter && rIdx < NumRpsCurrTempList0; rIdx++, i++)
        RefPicListTemp0[rIdx] = RefPicSetStCurrAfter[i]
    for (i = 0; i < NumRpsCurrLtCurr && rIdx < NumRpsCurrTempList0; rIdx++, i++)
        RefPicListTemp0[rIdx] = RefPicSetLtCurr[i]
    if(curr_pic_as_ref_enabled_flag)
        RefPicListTemp0[rIdx++] = currPic
}
for (rIdx = 0; rIdx <= num_ref_idx_l0_active_minus1; rIdx++)
    RefPicList0[rIdx] = ref_pic_list_modification_flag_l0 ?
        RefPicListTemp0[list_entry_l0[rIdx]] : RefPicListTemp0[rIdx]

If(curr_pic_as_ref_enabled_flag && !ref_pic_list_modification_flag_l0)
    RefPicList0[num_ref_idx_l0_active_minus1] = currPic
```

Fig. 7

```
rIdx = 0
while (rIdx < NumRpsCurrTempList0) {
    for (i = 0; i < NumPocStCurrBefore && rIdx < NumRpsCurrTempList0; rIdx++, i++)
        RefPicListTemp0 [rIdx] = RefPicSetStCurrBefore [i]
    for (i = 0; i < NumPocStCurrAfter && rIdx < NumRpsCurrTempList0; rIdx++, i++)
        RefPicListTemp0 [rIdx] = RefPicSetStCurrAfter [i]
    for (i = 0; i < NumPocLtCurr && rIdx < NumRpsCurrTempList0; rIdx++, i++)
        RefPicListTemp0 [rIdx] = RefPicSetLtCurr [i]
    if (curr pic as ref enabled flag)
        RefPicListTemp0 [rIdx++] = currPic
}
for (rIdx = 0; rIdx <= num ref idx 10 active minus1; rIdx++)
    RefPicList0 [rIdx] = ref pic list modification flag 10?
        RefPicListTemp0 [list entry 10 [rIdx]] : RefPicListTemp0 [rIdx]

If (curr pic as ref enabled flag && num ref idx 10 active minus1
    && NumRpsCurrTempList0 > num ref idx 10 active minus1+1)
    RefPicList0 [num ref idx 10 active minus1] = currPic
```

Fig. 8

```
rIdx = 0
while (rIdx < NumRpsCurrTempList0) {
    for (i = 0; i < NumPocStCurrBefore && rIdx < NumRpsCurrTempList0; rIdx++, i++)
        RefPicListTemp0 [rIdx] = RefPicSetStCurrBefore [i]
    for (i = 0; i < NumPocStCurrAfter && rIdx < NumRpsCurrTempList0; rIdx++, i++)
        RefPicListTemp0 [rIdx] = RefPicSetStCurrAfter [i]
    for (i = 0; i < NumPocLtCurr && rIdx < NumRpsCurrTempList0; rIdx++, i++)
        RefPicListTemp0 [rIdx] = RefPicSetLtCurr [i]
    if (curr_pic_as_ref_enabled_flag)                                    ——— Removed
        RefPicListTemp0 [rIdx++] = currPic
}
for (rIdx = 0; rIdx <= num_ref_idx_l0_active_minus1; rIdx++)
    RefPicList0 [rIdx] = ref_pic_list_modification_flag_l0?
        RefPicListTemp0 [list_entry_l0 [rIdx]] : RefPicListTemp0 [rIdx]

If (curr_pic_as_ref_enabled_flag)
    RefPicList0 [num_ref_idx_l0_active_minus1] = currPic
```

Fig. 9

```
rIdx = 0
while (rIdx < NumRpsCurrTempList0) {
    for (i = 0; i < NumPocStCurrBefore && rIdx < NumRpsCurrTempList0; rIdx++, i++)
        RefPicListTemp0 [rIdx] = RefPicSetStCurrBefore [i]
    for (i = 0; i < NumPocStCurrAfter && rIdx < NumRpsCurrTempList0; rIdx++, i++)
        RefPicListTemp0 [rIdx] = RefPicSetStCurrAfter [i]
    for (i = 0; i < NumPocLtCurr && rIdx < NumRpsCurrTempList0; rIdx++, i++)
        RefPicListTemp0 [rIdx] = RefPicSetLtCurr [i]
    if (curr_pic_in_ref_list_enabled_flag | curr_pic_in_ref_list_flag)    ← Removed
        RefPicListTemp0 [rIdx++] = currPic
}
for (rIdx = 0; rIdx <= num_ref_idx_l0_active_minus1; rIdx++)
    RefPicList0 [rIdx] = ref_pic_list_modification_flag_l0?
        RefPicListTemp0 [list_entry_l0[rIdx]] : RefPicListTemp0 [rIdx]

If (curr_pic_in_ref_list_flag && !ref_pic_list_modification_flag_l0
    && NumRpsCurrTempList0 > num_ref_idx_l0_active_minus1+1)
    RefPicList0 [num_ref_idx_l0_active_minus1] = currPic
```

Fig. 10

```
rIdx = 0
while (rIdx < NumRpsCurrTempList0) {
    for (i = 0; i < NumPocStCurrBefore && rIdx < NumRpsCurrTempList0; rIdx++, i++)
        RefPicListTemp0 [rIdx] = RefPicSetStCurrBefore [i]
    for (i = 0; i < NumPocStCurrAfter && rIdx < NumRpsCurrTempList0; rIdx++, i++)
        RefPicListTemp0 [rIdx] = RefPicSetStCurrAfter [i]
    for (i = 0; i < NumPocLtCurr && rIdx < NumRpsCurrTempList0; rIdx++, i++)
        RefPicListTemp0 [rIdx] = RefPicSetLtCurr [i]
    if (curr pic as ref enabled flag)
        RefPicListTemp0 [rIdx++] = currPic
}

If (curr pic as ref enabled flag && num ref idx 10 active minus1 > 0)
    RefPicListTemp0 [num ref idx 10 active minus1] = currPic for (rIdx = 0; rIdx <= num ref idx 10 active minus1; rIdx++)
    RefPicList0 [rIdx] = ref pic list modification flag 10?
    RefPicListTemp0 [list entry 10 [rIdx]] : RefPicListTemp0 [rIdx]
```

Fig. 11

```
rIdx = 0
while (rIdx < NumRpsCurrTempList0) {
  for (i = 0; i < NumPocStCurrBefore && rIdx < NumRpsCurrTempList0; rIdx++, i++)
    RefPicListTemp0 [rIdx] = RefPicSetStCurrBefore [i]
  for (i = 0; i < NumPocStCurrAfter && rIdx < NumRpsCurrTempList0; rIdx++, i++)
    RefPicListTemp0 [rIdx] = RefPicSetStCurrAfter [i]
  for (i = 0; i < NumPocLtCurr && rIdx < NumRpsCurrTempList0; rIdx++, i++)
    RefPicListTemp0 [rIdx] = RefPicSetLtCurr [i]
  if (curr_pic_as_ref_enabled_flag)
    RefPicListTemp0 [rIdx++] = currPic
}

If (curr_pic_as_ref_enabled_flag && rIdx – 1 > num_ref_idx_l0_active_minus1 &&
    num_ref_idx_l0_active_minus1 > 0) {
  RefPicListTemp0 [rIdx – 1] = RefPicListTemp0 [num_ref_idx_l0_active_minus1]
  RefPicListTemp0 [num_ref_idx_l0_active_minus1] = currPic
} for (rIdx = 0; rIdx <= num_ref_idx_l0_active_minus1; rIdx++)
  RefPicList0 [rIdx] = ref_pic_list_modification_flag_l0 ?
    RefPicListTemp0 [list_entry_l0 [rIdx]] : RefPicListTemp0 [rIdx]
```

Fig. 12

```
rIdx = 0
while (rIdx < NumRpsCurrTempList0) {
  for (i = 0; i < NumPocStCurrBefore && rIdx < NumRpsCurrTempList0; rIdx++, i++)
    RefPicListTemp0 [rIdx] = RefPicSetStCurrBefore [i]
  for (i = 0; i < NumPocStCurrAfter && rIdx < NumRpsCurrTempList0; rIdx++, i++)
    RefPicListTemp0 [rIdx] = RefPicSetStCurrAfter [i]
  for (i = 0; i < NumPocLtCurr && rIdx < NumRpsCurrTempList0; rIdx++, i++)
    RefPicListTemp0 [rIdx] = RefPicSetLtCurr [i]
  if (curr pic as ref enabled flag)
    RefPicListTemp0 [rIdx++] = currPic
}
If (curr_pic_as_ref_enabled_flag && rIdx − 1 > num_ref_idx_l0_active_minus1 &&
num_ref_idx_l0_active_minus1 > 0) {
  for (i = num_ref_idx_l0_active_minus1 + 1; i < rIdx; i++)
    RefPicListTemp0 [i] = RefPicListTemp0 [i-1]
  RefPicListTemp0 [num_ref_idx_l0_active_minus1] = currPic
}
for (rIdx = 0; rIdx <= num_ref_idx_l0_active_minus1; rIdx++)
  RefPicList0 [rIdx] = ref_pic_list_modification_flag_l0?
  RefPicListTemp0 [list_entry_l0[rIdx]] : RefPicListTemp0 [rIdx]
```

Fig. 13

METHOD AND APPARATUS FOR INTRA BLOCK COPY REFERENCE LIST CONSTRUCTION

CROSS REFERENCE TO RELATED APPLICATIONS

The present invention claims priority to U.S. Provisional Patent Application Ser. No. 62/154,373, filed on Apr. 29, 2015, entitled "Methods and apparatus of inter and intra picture block compensation", and U.S. Provisional Patent Application Ser. No. 62/169,698, filed on Jun. 2, 2015, entitled "Intra picture block compensation reference picture list construction", and U.S. Provisional Patent Application Ser. No. 62/182,685, filed on Jun. 22, 2015, entitled "Methods and apparatus of intra picture block copy and inter coding unification", and U.S. Provisional Patent Application Ser. No. 62/183,799, filed on Jun. 24, 2015, entitled "Methods and apparatus of intra picture block copy as a reference picture". The U.S. Provisional Patent Applications are hereby incorporated by reference in their entireties.

FIELD OF THE INVENTION

The present invention relates to image and video coding using Intra Picture Block Copy (IntraBC) mode. In particular, the present invention relates to reference picture list construction process of video coding with IntraBC mode for screen content coding or video coding.

BACKGROUND AND RELATED ART

In the current development of range extension (RExt) for High Efficiency Video Coding (HEVC) standard, Screen Content Coding (SCC) is investigated to provide efficiently compression for non-camera captured video contents in various formats including YUV444, RGB444, YUV422, and YUV420. During the SCC development, various coding tools including Intra Picture Block Copy (IntraBC) have been adopted. IntraBC is a block matching technique in which a coding unit (CU) is predicted as a displacement from an already reconstructed block of samples in the same picture. IntraBC is especially effective for screen content video since it utilizes correlation among repeating patterns which typically occurs in text or still graphics in the picture. The IntraBC technique was first disclosed in JCTVC-M0350 (Budagavi et al., AHG8. *Video coding using Intra motion compensation*, JCT-VC of ITU-T SG16 WP3 and ISO/IEC JTC 1/SC 29/WG11 13$^{th}$ Meeting: Incheon, KR, 18-26 Apr. 2013, Document: JCTVC-M0350). FIG. 1 shows an example according to JCTVC-M0350, where a current CU 110 in a current picture 10 is coded using Intra MC (motion compensation). A prediction block 120 in the current picture 10 is located from the current CU 110 according to a displacement vector 112. In this example, the search area for the current CU is limited to a current CTU (coding tree unit) 130, a left CTU 140, and a left-left CTU 150 in the current picture 10. The prediction block 120 is obtained from the already reconstructed region of the current picture 10. The displacement vector 112, also called the block vector (BV), and residual for the current CU 110 are coded. In HEVC, a picture is initially divided into CTUs which are then divided for each luma or chroma component into coding tree blocks (CTBs). Each CTB is recursively partitioned into one or more coding units (CUs) according to quadtree structure. CUs may be divided into multiple prediction units (PUs) during a prediction phase of video coding. To code the prediction residual after the prediction phase, each CU is divided into multiple transform units (TUs) for block transform and quantization.

Some modifications for IntraBC are disclosed in JCTVC-N0256 (Pang et al., *Non-RCE3*: *Intra Motion Compensation with 2-D MVs*, JCT-VC of ITU-T SG16 WP3 and ISO/IEC JTC 1/SG 29/WG11 14$^{th}$ Meeting: Vienna, AT, 25 Jul.-2 Aug. 2013, Document: JCTVC-N0256) to extend the IntraBC technique to support two dimensional BVs. Furthermore, a BV coding method in JCTVC-N0256 uses a left or above BV as a BV predictor and codes resulting BV differences (BVD). A flag is signaled first to indicate whether the BVD is zero, then an exponential-Golomb of 3$^{rd}$ order code is used to encode the remaining absolute level of the BVD when the BVD is not zero. The sign of the BVD is also coded by a flag. Another coding method in JCTVC-N0256 uses no predictor for BV and the BV is coded using the exponential-Golomb codes. Interpolation filters are removed to allow pipeline processing for the IntraBC technique.

A valid BV restricts the search area to already reconstructed area in the current picture. A ladder shape Intra BC search range constraint is adopted in SCM-3.0 (Screen content coding test model-3.0) to allow parallel processing in wavefront parallel process (WPP). An example of the ladder shape IntraBC search range is shown in FIG. 2, a valid search area for an Intra BC block in a current CTU 212 is constrained to the shaded CTUs 210 and reconstructed blocks in the current CTU 212.

In the 20$^{th}$ JCT-VC meeting in Geneva, February 2015, signaling of IntraBC is unified with Inter coding mode. The current picture is treated as a reference picture and inserted into one or both reference picture lists for blocks coded in IntraBC mode. Block vector prediction and coding in Intra BC mode become the same as motion vector prediction and coding in Inter mode. Although this unification simplifies the design for video encoders and decoders, there are some remaining issues needed to be solved. One of the issues is the current picture may not always be included in the reference picture list. One or more syntax element signaled in the bitstream restricts a maximum size allowed in the reference picture list so one or more reference pictures may be eliminated from the reference picture list during reference picture list construction. A method to guarantee the existence of the current picture in the reference picture list for blocks coded in IntraBC mode is desired.

BRIEF SUMMARY OF THE INVENTION

A method and apparatus of reference picture list construction for video encoding and decoding comprises considering the existence of a current picture in a final reference picture list. Input data associated with a current slice of the current picture are received to determine a temporary reference picture list for the current slice in an initialization stage of reference picture list construction. A final reference picture list is then derived from the temporary reference picture list, for example by copying first N entries of the temporary reference picture to the final reference picture list, where N represents a maximum number of entries allowed in the final reference picture list. In some embodiments, reference picture list modification is allowed to alter any entry of the final reference picture list. The final reference picture list is adjusted by setting the current picture to a predefined position as a reference picture for Intra Picture Block Copy (IntraBC) coded blocks when one or more criteria are met. The current slice is encoded or decoded according to the final reference picture list. The current picture included in the final reference picture list in some embodiments is an unfiltered version of the current picture as the IntraBC coded blocks are coded by referencing to a reconstructed block before loop filtering.

Embodiments of the reference picture list construction process checks one or more following criteria before setting the current picture to the predefined position of the final reference picture list. Embodiments of the criteria include an IntraBC mode is allowed or used in the current slice, reference picture list modification is not used, the maximum number of entries allowed in the final reference picture list (N) is greater than or equal to two, an entry number of the temporary reference picture list is greater than N, and there is no entry in the final reference picture list that is equal to the current picture.

In an embodiment, reference picture list modification is restricted to disallow removing the current picture from the final reference picture list. In another embodiment, the final reference picture list is adjusted by swapping positions between the current picture and a reference picture originally in the predefined position. The predefined position of some embodiments is a second position or a last position of the final reference picture list.

In some other embodiments of the reference picture list construction for video encoder and decoder, the method comprises receiving input data associated with a current slice in a current picture, determining a temporary reference picture list for the current slice in an initialization stage of reference picture list construction, and setting the current picture to an $N^{th}$ position of the temporary reference picture list if one or more criteria is met. N again represents the maximum number of reference pictures allowed in the final reference picture list. The reference picture list construction process then derives the final reference picture list from the temporary reference picture list by copying first N entries of the temporary reference picture list to the final reference picture list, and the final reference picture list is used for encoding or decoding the current slice.

Other aspects and features of the invention will become apparent to those with ordinary skill in the art upon review of the following descriptions of specific embodiments.

BRIEF DESCRIPTION OF THE DRAWINGS

FIGS. 5-13 show exemplary descriptions for construction of a final reference picture list in accordance with different embodiments.

DETAILED DESCRIPTION OF THE INVENTION

Figure 1:
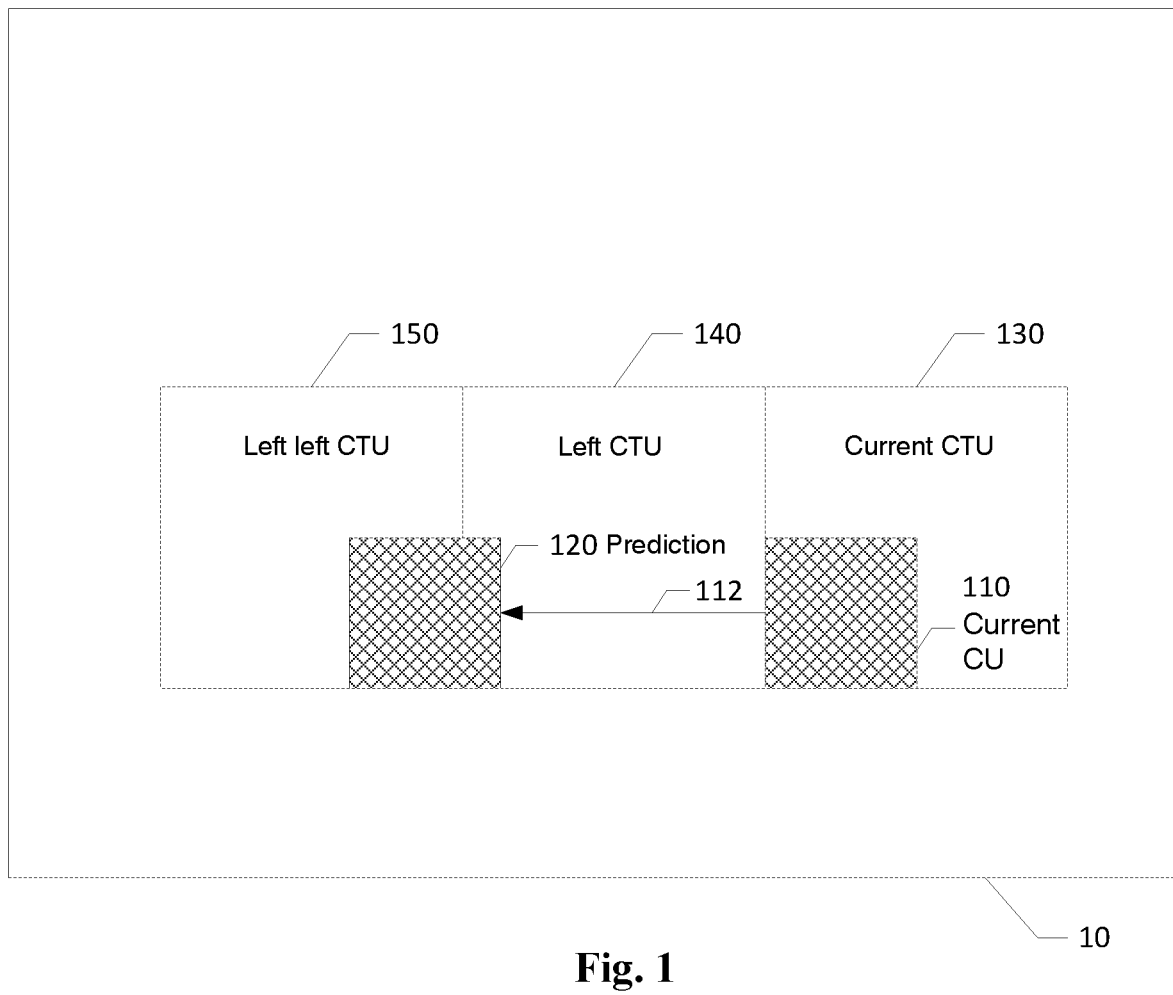
FIG. 1 illustrates an example of an IntraBC coded current coding unit (CU) having a block vector (BV) pointing to a prediction block in the same picture.
Figure 2:
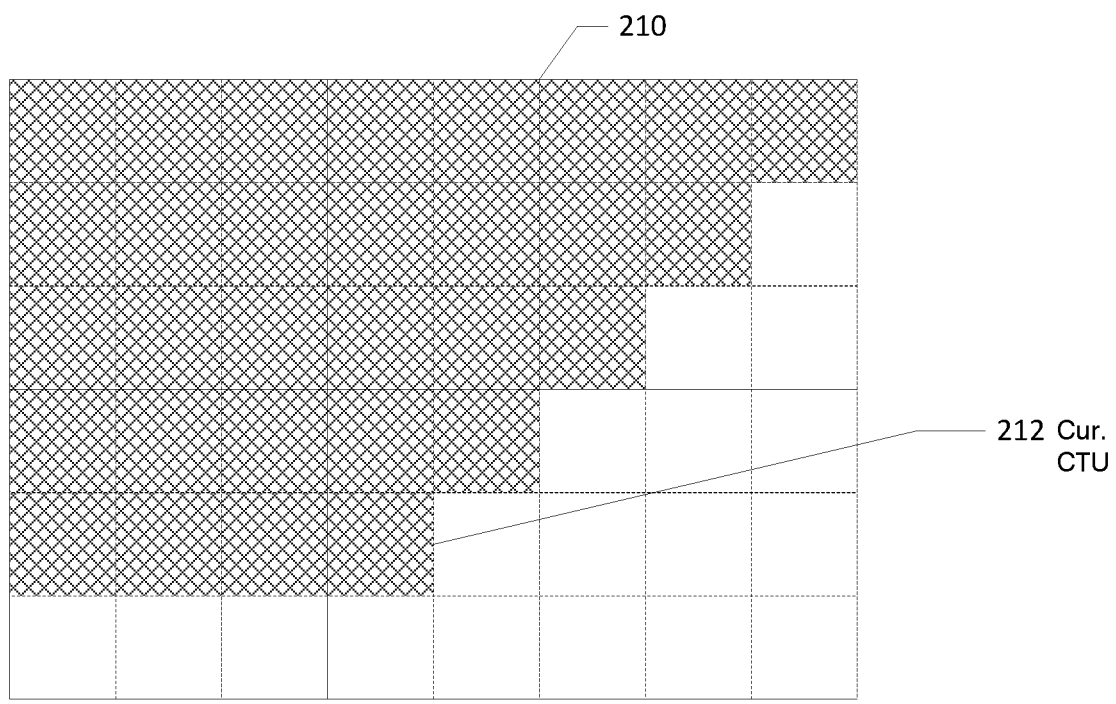
FIG. 2 illustrates an exemplary ladder shape search area constraint for IntraBC.

It will be readily understood that the components of the present invention, as generally described and illustrated in the figures herein, may be arranged and designed in a wide variety of different configurations. Thus, the following more detailed descriptions of the embodiments of the methods and apparatus of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. In the following discussion and in the claims, the term "including" and "comprising" are used in an open-ended fashion, and thus should be interpreted to mean "including, but not limited to . . . ".

To unify IntraBC mode signaling and Inter coding mode signaling, a current picture is treated as a reference picture and included in one or both reference picture lists. Specifically, an unfiltered version of the current picture is treated as the reference picture for blocks coded using IntraBC mode. The unfiltered version of the current picture is obtained before processing by loop filtering operations. For example, the loop filtering operations for video encoders and decoders complied with the HEVC standard include deblocking and sample adaptive offset (SAO) filters. A prediction unit (PU) is determined to be IntraBC coded if the reference picture index points to the current picture, whereas the PU is inter coded if the reference picture index points to a temporal reference picture. During an initialization stage of reference picture list construction, short term reference pictures are first placed in a temporary reference picture list followed by long term reference pictures. The current picture is then inserted in the temporary reference picture list according to a flag indicating IntraBC mode is allowed or used. After the initialization stage, the reference picture list construction is completed by deriving a final reference picture list from the temporary reference picture list based on a slice level syntax and a modification flag. The slice level syntax indicates the maximum number of reference pictures allowed in the final reference picture list, and the modification flag indicates whether positions of reference pictures in the final reference picture list are reordered. When the modification flag is enabled, each reference picture may be assigned to new positions in the final reference picture list. If the number of entries in the temporary reference picture list is greater than the maximum number of reference picture allowed in the final reference picture list, one or more reference pictures, which may include the current reference picture, will be discarded.

Figure 3:
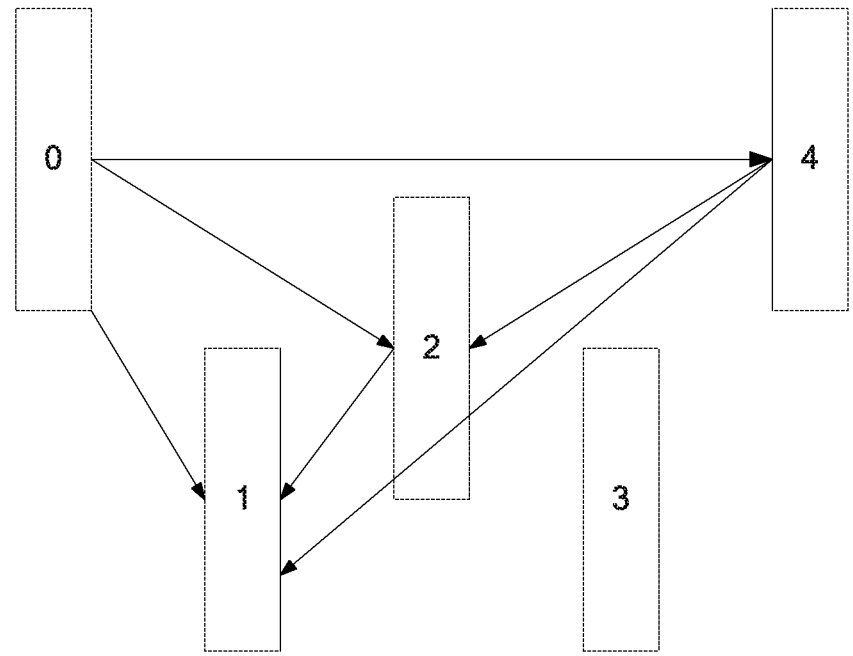
FIG. 3 illustrates an example of reference picture list construction for List 0 when the maximum number of reference pictures allowed in the reference picture list is three.

FIG. 3 illustrates an example of reference picture list construction for List 0 when the maximum number of reference pictures allowed in the reference picture list is three. The decoding order for the five pictures shown in FIG. 3 is picture 0, picture 4, picture 2, picture 1, and picture 3 and the display order are picture 0, picture 1, picture 2, picture 3, and picture 4. Assuming IntraBC is allowed for all the five pictures, the reference picture list for picture 0 only includes the current picture (picture 0), the reference picture list for picture 4 includes picture 0 and the current picture (picture 4), and the reference picture list for picture 2 includes picture 0, picture 4, and the current picture (picture 2). The reference picture list for picture 1 is first constructed to have picture 0, picture 2, picture 4 together with the current picture (picture 1), since the maximum number of reference pictures allowed is three, the last reference picture in the reference picture list is discarded. The reference picture list for picture 3 is first constructed to have picture 2, picture 0, picture 4, and the current picture (picture 3), and again, the last reference picture in the reference picture list is discarded. For both picture 1 and picture 3, the current picture is removed from the final reference picture list. In the case when the current picture is not present in the final reference picture list, blocks cannot be encoded in IntraBC mode or IntraBC coded blocks cannot be correctly decoded. The use of reference picture list modification through the modification flag may add the current picture back to the final reference picture list; however, it is not a normative way to solve the above problem.

Reference picture list is constructed in both encoder and decoder sides, embodiments of the present invention adjust a reference picture list by setting the current picture to a predefined position according to various criteria to ensure the current picture is available in the reference picture list for IntraBC coded blocks. In the following embodiments, List 0 is used as an example. Similar changes can be applied to List 1 if the current picture is inserted in the reference picture list for List 1.

First Embodiment

In a first embodiment of reference picture list construction, input data associated with a current slice in a current picture is received to first determine a temporary reference picture list for the current slice in an initialization stage of reference picture list construction. The temporary reference picture list includes at least one temporal reference picture as well as the current picture if an Intra picture block copy (IntraBC) mode is allowed in the current slice. A final reference picture list is derived from the temporary reference picture list by copying the first N entries of the temporary reference picture list to the final reference picture list, where N is a maximum number of reference pictures allowed in the final reference picture list. The final reference picture list can also be reordered with possible reference picture list modification (RPLM). In this embodiment, the current picture is set to a predefined position of the final reference picture list regardless the use of RPLM. In a variation of the first embodiment, RPLM is not used or RPLM is restricted to disallow changing the position of the current picture. Another variation disables RPLM to remove the current picture from the final reference picture list if the IntraBC mode is allowed.

In the first embodiment, if an entry number of the temporary reference picture list is greater than N, the final reference picture list is then adjusted to include the current picture in a predefined position of the final reference picture list if the IntraBC mode is allowed in the current slice, and the final reference picture list is used for encoding or decoding the current slice. In some other embodiments, whether to set the current picture to the predefined position is determined regardless the comparison result between the entry number of the temporary reference picture list and N.

The predefined position in one example is the last position of the final reference picture list, and in another example, the predefined position is the first position, the second position, or other position of the final reference picture list. For example, the predefined position is the second position and the current picture is inserted to the final reference picture list after a predetermined reference picture. The predetermined reference picture is a short term reference picture before the current picture in display order, a short term reference picture after the current picture in display order, or a long term reference picture. An exemplary description for construction of a final reference picture list for list 0 (RefPicList0) in accordance with the first embodiment is shown in FIG. 5. The frame 510 highlights syntax that is different from other embodiments described in this disclosure (Similarly, in FIGS. 6-13, frames similar to the frame 510 are used to highlight syntax that is different from other embodiments). NumRpsCurrTempList0 is an entry number of the temporary reference picture list, RefPicListTemp0 is the temporary reference picture list, and a flag curr_pic_as_ref_enabled_flag indicates whether IntraBC is allowed to be used for the current slice. The flag curr_pic_as_ref_enabled_flag in the first embodiment is signaled at the sequence level; however, this flag may be signaled at the picture level or slice level. RefPicSetStCurrBefore [i], RefPicSetStCurrAfter [i], and RefPicSetLtCurr [i] are short term reference picture(s) before the current picture in display order, short term reference picture(s) after the current picture in display order, and long term reference picture(s) respectively. num_ref_idx_l0_active_minus1 is the maximum number of reference pictures allowed in the final reference picture list minus one, which is N−1. The use of the reference picture list modification is indicated by a flag ref_pic_list_modification_flag_l0.

Second Embodiment

A second embodiment is similar to the first embodiment, but after the construction of the final reference picture list, an additional criterion is checked. The additional criterion is to check whether any entry in the final reference picture list equals to the current picture. The current picture is inserted in the predefined position of the final reference picture list only when there is no entry in the final reference picture list that equals to the current picture.

Third Embodiment

In this embodiment, after the initialization stage of reference picture list construction and after the construction of the final reference picture list, only when reference picture list modification (RPLM) is not used (ref_pic_list_modification_flag_l0 is equal to 0), and if the entry number of the temporary reference picture list (NumRpsCurrTempList0) is greater than the maximum number of reference pictures allowed in the final reference picture list (num_ref_idx_l0_active_minus1+1, or N in the first embodiment), a predefined position in the final reference picture list is set to be the current picture. For example, the final reference picture list is adjusted by setting the current picture to the last position of the final reference picture list only when RPLM is not used and NumRpsCurrTempList0 is greater than N. A variation of the third embodiment sets the current picture to the predefined position when RPLM is not used and regardless the entry number of the temporary reference picture list. The third embodiment allows reference picture list modification to change one or more entries in the list as needed, and the current picture is set to the predefined position when RPLM is not used. A RPLM flag (ref_pic_list_modification_flag_10) indicates whether RPLM is used. In FIG. 6, the last position of the final reference picture is indicated by the entry with an index value equal to num_ref_idx_10_active_minus1.

Fourth Embodiment

A fourth embodiment sets a current unfiltered picture to a predefined position of the final reference picture list by checking one or both the following criteria: a flag signals that the current unfiltered picture is used as a reference picture and the reference picture list modification for this list is not used. The flag is signaled at a sequence level, picture level, or slice level. FIG. 7 illustrates an example of reference picture list construction which checks both the flag and the reference picture list modification.

Fifth Embodiment

In a fifth embodiment, the final reference picture list is adjusted by setting the current picture to the predefined position only if the maximum number of reference pictures allowed in the final reference picture list (N) is greater than 1, or is greater than or equal to 2. If the size of the final reference picture list N is restricted to only one reference picture, the final reference picture list is not further adjusted to include the current picture. The fifth embodiment ensures at least one temporal reference picture for Inter coding mode is included in the final reference picture list. An example of reference picture list construction according to the fifth embodiment is shown in FIG. 8, after the initialization stage and after construction of the final reference picture list with possible reference picture list modification, if num_ref_idx_10_active_minus1 (N−1) is greater than 0 (i.e. if N is greater than 1), and the entry number of the temporary reference picture list (NumRpsCurrTempList0) is greater than num_ref_idx_10_active_minus1+1 (N), the last entry of the final reference picture list is set to be the current picture.

A variation of the fifth embodiment is to combine with the fourth embodiment, where the current picture is set to the predefined position only when reference picture list modification is not used (ref_pict_list_modification_flag_10 is equal to 0) and when the maximum number of reference pictures allowed in the final reference picture list is greater than 1(num_ref_idx_10_active_minu1 is greater than 0).

Sixth Embodiment

A sixth embodiment is similar to the fifth embodiment but with an additional criterion, after construction of the final reference picture list, only when there is no entry in the final reference picture list that equals to the current picture, the current picture is set to the predefined position of the final reference picture list.

Seventh Embodiment

In a seventh embodiment, the operation of including the current picture in the temporary reference picture list is removed at the initialization stage of reference picture list construction. After the initialization stage and after the construction of the final reference picture list with possible reference picture list modification, the current picture is set to the predefined position of the final reference picture list. For example, the entry with an index value equal to num_ref_idx_10_active_minus1 (N−1) in the final reference picture list is set to be the current picture as shown in FIG. 9.

A variation of the seventh embodiment is to combine with the fifth embodiment, where an additional criterion is checked before setting the current picture to the predefined position of the final reference picture list. Only if the maximum number of reference pictures allowed in the final reference picture list is greater than one and the IntraBC mode is allowed or used, the current picture is set to the predefined position in the final reference picture list. For example, the final reference picture list is adjusted by inserting the current picture in the last position if num_ref_idx_10_active_minus1 is greater than 0.

Eighth Embodiment

In this embodiment, an enabling flag curr_pic_in_ref_list_flag is signaled at picture or slice level to indicate the use of the current picture as a reference picture for IntraBC mode. The enabling flag curr_pic_in_ref_list_flag is equal to 1 when the current picture is used as a reference picture for the current picture itself. In the reference picture list construction of the eighth embodiment, this enabling flag is used to determine the use of IntraBC mode instead of the flag curr_pict_as_ref_enabled_flag signaled at the sequence level. An exemplary description of the reference picture list construction according to the seventh embodiment is shown in FIG. 10.

A variation of the eighth embodiment is after construction of the final reference picture list, only when there is no entry in the final reference picture list that equals to the current picture, the current picture is inserted in the predefined position of the final reference picture list. The enabling flag curr_pic_in_ref_list_flag of the eighth embodiment may replace the flag curr_pict_as_ref_enabled_flag in the previous embodiments to indicate whether IntraBC is allowed for the current slice.

Ninth Embodiment

In a ninth embodiment, during the initialization stage of reference picture list construction, an entry with an index value equal to N−1 (num_ref_idx_10_active_minus1) in a temporary reference picture list is set to be the current picture when the IntraBC mode is allowed. The entry with index value N−1 in the temporary reference picture list is the $N^{th}$ position of the temporary reference picture list as the index value for the entries starts from 0. A final reference picture list is constructed by copying N entries of the temporary reference picture list to the final reference picture list with possible reference picture list modification. FIG. 11 below shows an exemplary description of the ninth embodiment.

A variation of the ninth embodiment is shown in FIG. 12, instead of setting the current picture to the $N^{th}$ position of the temporary reference picture list at the initialization stage, the entry with index value N−1 is swapped with the entry in the temporary reference picture list that stores the current picture.

Another variation of the ninth embodiment is pushing remaining entries following the current picture in the temporary reference picture list one step towards the end, and then inserting the current picture into the $N^{th}$ position (the entry with index value equal to N−1) in the temporary reference picture list. An exemplary description is shown in FIG. 13.

Figure 4:
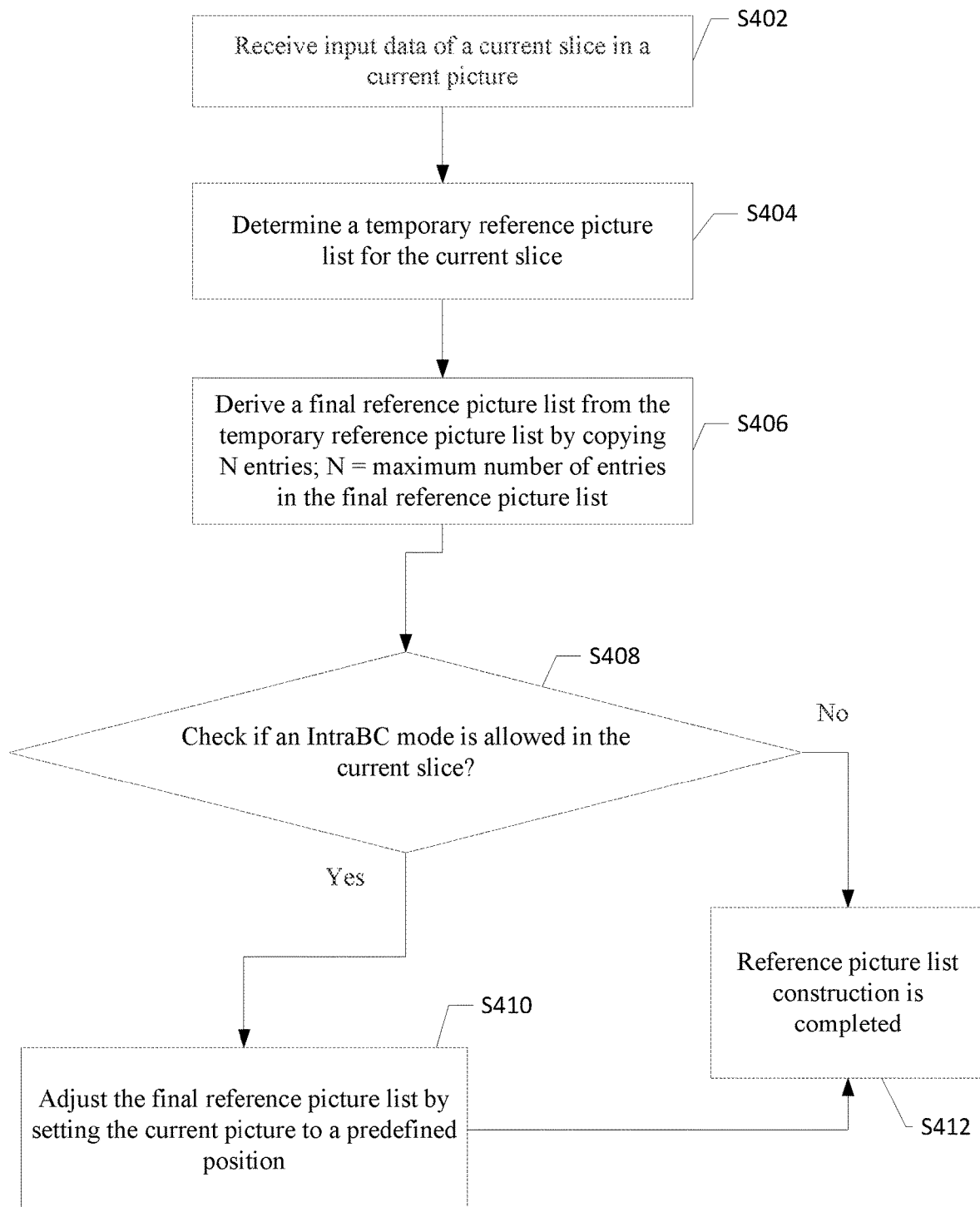
FIG. 4 is a flow chart illustrating an example of reference picture list construction for List 0 according to an embodiment of the present invention.

FIG. 4 shows a flow chart of reference picture list construction for List 0 according to an embodiment of the present invention. The reference picture list construction process begins with receiving input data associated with a current slice in a current picture in step S402. In step S404, a temporary reference picture list for List 0 is determined for the current slice, this is also referred to as an initialization stage of the reference picture list construction process. In an exemplary initialization stage, one or more temporal reference pictures such as one or a combination of a short term reference picture before the current picture in display order, a short term reference picture after the current picture in display order, and a long term reference picture, are included in the temporary reference picture list. In some embodiments, the initialization stage also includes an unfiltered version of the current picture in the temporary reference picture list if an IntraBC mode is used or allowed for the current slice. A final reference picture list is derived from the temporary reference picture list by copying N entries of the temporary reference picture list in step S406. N represents a maximum number of reference pictures allowed in the final reference picture list for List 0. The temporary reference picture list may have entries more than the maximum number allowed in the final reference picture list so some entries in the temporary reference picture list may be eliminated in step S406. Step S408 checks if the IntraBC mode is used or allowed for the current slice, for example, step S408 checks if the current picture is used as a reference picture by checking a sequence, picture, or slice level flag. If the IntraBC mode is used or allowed in the current slice, the final reference picture list for List 0 is adjusted by setting the unfiltered version of the current picture to a predefined position in the final reference picture list in step S410, else the final reference picture list is unadjusted in step S412.

Although the first embodiment to the ninth embodiment of reference picture list construction in video coding are described, the invention is not limited to these embodiments. In each embodiment, the choice of the reference picture list construction process is an example to illustrate various embodiments and should not be understood as a restriction or a requirement for any embodiment of the invention. The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiments of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding video data, comprising:
   receiving input data associated with a current slice in a current picture;
   determining a temporary reference picture list for the current slice, and including the current picture at the end of the temporary picture list when an Intra Picture Block Copy (IntraBC) mode is allowed for the current slice, in an initialization stage of reference picture list construction;
   deriving a final reference picture list from the temporary reference picture list by including N entries of the temporary reference picture list to the final reference picture list, wherein N is a maximum number of reference pictures allowed in the final reference picture list;
   adjusting the final reference picture list by setting the current picture to a predefined position of the final reference picture list when an entry number of the temporary reference picture list is greater than N, reference picture list modification is not performed, and there is no entry in the final reference picture list that equals to the current picture; and
   encoding or decoding the current slice according to the final reference picture list.

2. The method of claim 1, further comprising determining if N is greater than or equal to 2, and skipping said adjusting the final reference picture list by setting the current picture to the predefined position when N is less than 2 to ensure the final reference picture list comprises one temporal reference picture.

3. The method of claim 1, further comprising:
   when the reference picture list modification is performed, disallowing the reference picture list modification to remove the current picture from the final reference picture list if the IntraBC mode is allowed in the current slice.

4. The method of claim 1, wherein said adjusting the final reference picture list comprises swapping positions between the current picture and a reference picture originally in the predefined position of the final reference picture list.

5. The method of claim 1, wherein the predefined position is a last position of the final reference picture list.

6. The method of claim 1, wherein the predefined position is a second position of the final reference picture list.

7. The method of claim 6, wherein a first position of the final reference picture list is a short term reference picture before the current picture in display order, a short term reference picture after the current picture in display order, or a long term reference picture.

8. The method of claim 1, wherein the current picture is included in the temporary reference picture list if the IntraBC mode is allowed during the initialization stage of reference picture list construction.

9. The method of claim 1, wherein reference picture list modification is used or not used for deriving the final reference picture list from the temporary reference picture list.

10. An apparatus of coding video data, the apparatus comprising one or more electronic circuits configured to:
receive input data associated with a current slice in a current picture;
determine a temporary reference picture list for the current slice and include the current picture at the end of the temporary picture list when an Intra Picture Block Copy (IntraBC) mode is allowed for the current slice, in an initialization stage of reference picture list construction;
derive a final reference picture list from the temporary reference picture list by including N entries of the temporary reference picture list to the final reference picture list, wherein N is a maximum number of reference pictures allowed in the final reference picture list;
adjust the final reference picture list by setting the current picture to a predefined position of the final reference picture list when an entry number of the temporary reference picture list is greater than N, reference picture list modification is not performed, and there is no entry in the final reference picture list that equals to the current picture; and
encode or decode the current slice according to the final reference picture list.

11. A method of coding video data, comprising:
receiving input data associated with a current slice in a current picture;
determining a temporary reference picture list for the current slice, and including the current picture at the end of the temporary picture list when an Intra Picture Block Copy (IntraBC) mode is allowed for the current slice, in an initialization stage of reference picture list construction;
deriving a final reference picture list from the temporary reference picture list by including N entries of the temporary reference picture list to the final reference picture list, wherein N is a maximum number of reference pictures allowed in the final reference picture list, and there is no entry in the final reference picture list that equals to the current picture;
adjusting the final reference picture list by setting the current picture to a predefined position of the final reference picture list when an entry number of the temporary reference picture list is greater than N, and reference picture list modification is not performed; and
encoding or decoding the current slice according to the final reference picture list.

* * * * *